United States Patent [19]

Scragg et al.

[11] 4,070,861

[45] Jan. 31, 1978

[54] SOLAR REACTOR COMBUSTION CHAMBER

[75] Inventors: Robert L. Scragg; Alfred B. Parker, both of Miami, Fla.

[73] Assignee: Solar Reactor Corporation, Miami, Fla.

[21] Appl. No.: 692,495

[22] Filed: June 3, 1976

Related U.S. Application Data

[63] Continuation-in-part of Ser. No. 657,383, Feb. 10, 1976, Pat. No. 4,026,112, which is a continuation-in-part of Ser. No. 588,888, June 20, 1975, Pat. No. 4,024,715, which is a continuation-in-part of Ser. No. 564,087, April 1, 1975, Pat. No. 3,998,205.

[51] Int. Cl.$^2$ ................................................ F03G 7/02
[52] U.S. Cl. ..................................... 60/641; 60/39.12; 60/39.46 G; 126/270; 126/263; 60/649; 250/527
[58] Field of Search ............... 60/39.46 G, 641, 39.12, 60/649; 126/270, 271, 263; 250/527

[56] References Cited

U.S. PATENT DOCUMENTS 3,845,317  10/1974  Lindwall et al. ................. 250/527

*Primary Examiner*—Allen M. Ostrager
*Attorney, Agent, or Firm*—Cushman, Darby & Cushman

[57] ABSTRACT

A solar reactor combustion chamber is disclosed which includes a concrete or other suitable housing having a reactor chamber and a combustion chamber therein. A solar intensifier, such as a parabolic reflector, is mounted on top of the reactor housing. The parabolic reflector collects and intensifies solar rays and guides them through a solar sight glass, mounted on top of the housing, into the reactor chamber. The concentrated beam of light is directed onto a light disperser within the reactor chamber which disperses solar rays throughout the chamber. Molecular hydrogen and chlorine is conducted into the reactor chamber wherein in the presence of light the chlorine molecules expand into atomic chlorine. The chlorine and hydrogen molecules are forced into the combustion chamber together with oxygen wherein the chlorine and hydrogen react with controlled explosive violence to form HCl. The heat and pressure thus formed are utilized to heat or drive suitable utilization devices, such as turbines or pistons.

12 Claims, 7 Drawing Figures

4,070,861

SOLAR REACTOR COMBUSTION CHAMBER

BACKGROUND OF THE INVENTION

This application is a continuation-in-part of copending application Ser. No. 657,383 filed Feb. 10, 1976, titled SOLAR REACTOR ENGINE now U.S. Pat. No. 4,026,112, which, in turn, is a continuation-in-part of copending application Ser. No. 588,888, filed June 20, 1975, and titled SOLAR REACTOR ENGINE now U.S. Pat. No. 4,024,715, which, in turn, is a continuation-in-part of copending application Ser. No. 564,087, filed Apr. 1, 1975, now U.S. Pat. No. 3,998,205 entitled SOLAR REACTOR STEAM GENERATOR METHOD AND APPARATUS. Each of these applications are incorporated herein by reference thereto.

This invention relates to reactors and combustion chambers and, more particularly, is related to solar reactors and combustion chambers which utilize molecular hydrogen and chlorine gases in the presence of solar or artificial light energy to produce atomic hydrogen and chlorine which are exothermically combined in the presence of atmospheric oxygen to produce heat energy which is converted into chemical or mechanical energy for propulsion and/or for the generation of electrical power.

In the process of converting fossil fuels into mechanical or chemical energy for the purpose of generating mechanical or electrical power, two types of combustion processes are known, i.e., external and internal combustion. External combustion is generally accomplished by burning a fuel in an open combustion chamber resulting in a flame which is typically supported by atmospheric oxygen. Internal combustion is typically accomplished by introducing a fuel and a fixed amount of oxygen or other suitable oxidizing agent within an enclosed combustion chamber. The fuel and oxidizing agent are ignited which results in a rapid burning or explosion within the chamber. Both the internal and external combustion properties are generally sustained by an open flame or an electrical arc. Both the internal and external combustion processes result in a typically low efficiency conversion of energy. Further, both methods produce harmful exhaust emissions and pollutants and all methods of converting fossil fuels into energy are dependent upon a limited and increasingly expensive supply of such fuels.

It, therefore, is an object of this invention to provide a method and apparatus for generating energy by means of a non-fossil fuel.

It is another object of this invention to provide an energy-generation system wherein products of combustion formed therein can be totally cleansed of emissions and pollutants which are harmful to the atmosphere and the environment.

It is yet another object of this invention to provide a reactor combustion chamber wherein an exothermic reaction is supported by solar and/or artificial light.

It is still another object of this invention to provide an energy-generation system wherein the products of combustion are recycled to continuously support an exothermic reaction therein.

SHORT STATEMENT OF THE INVENTION

Accordingly, the present invention relates to a solar reactor combustion system which includes a solar reactor chamber having means for controllably coupling molecular chlorine and hydrogen thereto and a combustion chamber having means for controllably coupling atomic chlorine, hydrogen, and atmospheric oxygen thereto. A parabolic reflector, or other suitable focusing means, is positioned with respect to the reactor chamber and is controlled to follow the sun by means of an automated azimuth tracker. The parabolic reflector concentrates solar rays onto a focal point reflector which reflects the solar beam via a series of reflectors through a solar sight glass and into the reactor chamber. The beam of light passes through the reactor chamber and onto the surface of a light dispersal means such as a conical reflector valve at the base of the reactor chamber. Thus, the solar rays are dispersed throughout the reactor chamber. The chlorine gas molecules, coupled to the reactor chamber, are split into ionized chlorine atoms by the solar rays. The resulting hydrogen and chlorine cause an increase in the pressure of the reactor chamber, thereby forcing the chlorine atoms and hydrogen into the combustion chamber. In the combustion chamber, the chlorine and hydrogen react in the presence of atmospheric oxygen with controlled explosive violence. The hot gases formed from the explosion can be utilized to provide mechanical and/or electrical power. As an example, the hot gases can be utilized to heat a boiler, compress a piston, or drive a turbine.

BRIEF DESCRIPTION OF THE DRAWINGS

Other objects, features and advantages of the invention will become more fully apparent from the following detailed description of the preferred embodiment, the appended claims and the accompanying drawings in which:

DETAILED DESCRIPTION OF THE PREFERRED EMBODIMENTS

Throughout the detailed description of the embodiments of the present invention, like numerals will correspond to like elements in the figures.

Figure 1:
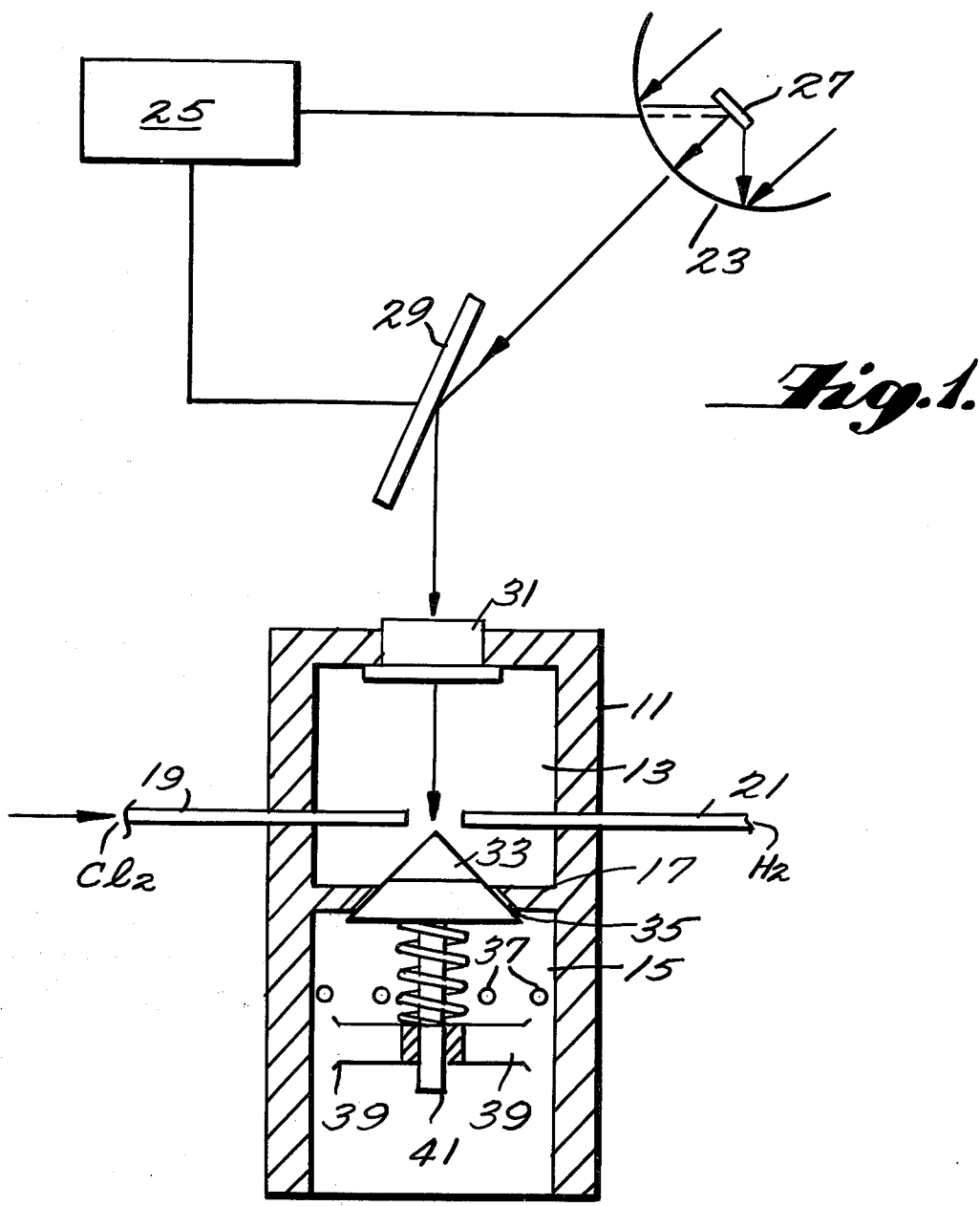
FIG. 1 is a section view taken in elevation of one embodiment of the solar reactor combustion chamber.

Refer now to FIG. 1 where there is disclosed a simplified section view of one embodiment of the solar reactor combustion chamber of the present invention. The solar reactor combustion chamber includes a housing 11 which may, for example, be formed of reinforced concrete or other materials capable of withstanding very high pressure levels. The housing is divided into a reaction chamber 13 and a combustion chamber 15, by means of a wall 17. Fuel or reactants are fed into the reactor chamber 13, via tubes 19 and 21, respectively. In the preferred embodiment, chlorine is fed into the reactor via tube 19 and hydrogen is fed into the reactor chamber via tube 21 at controlled rates.

Figure 7:
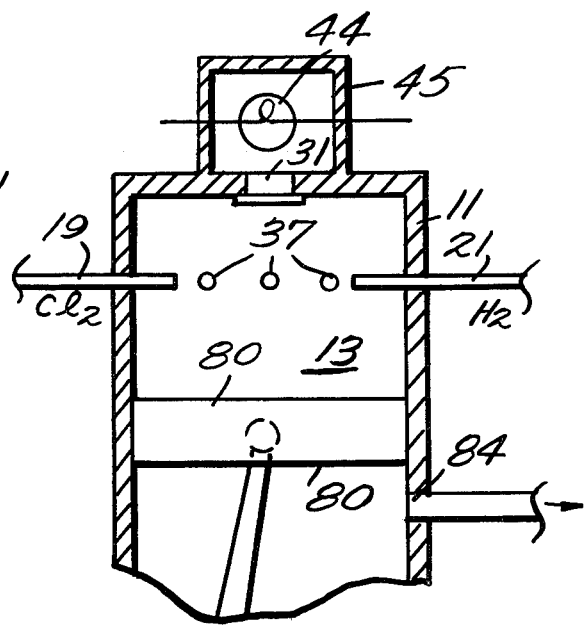
FIG. 7 is a simplified section view taken in elevation of the solar reactor combustion chamber utilized to drive a single cycle piston engine.

In one embodiment of the invention, solar rays are concentrated and intensified by an azimuth tracking parabolic reflector system of the type well known in the art. Solar radiation is directed by parabolic reflector 23 which tracks the sun by means of the azimuth tracker 25. The parabolic FIG. 7 is a simplified section view taken in elevation of the solar reactor combustion chamber utilized to drive a single cycle piston engine.

DETAILED DESCRIPTION OF THE PREFERRED EMBODIMENTS

Throughout the detailed description of the embodiments of the present invention, like numerals will correspond to like elements in the figures.

Refer now to FIG. 1 where there is disclosed a simplified section view of one embodiment of the solar reactor combustion chamber of the present invention. The solar reactor combustion chamber includes a housing 11 which may, for example, be formed of reinforced concrete or other materials capable of withstanding very high pressure levels. The housing is divided into a reaction chamber 13 and a combustion chamber 15, by means of a wall 17. Fuel or reactants are fed into the reactor chamber 13, via tubes 19 and 21, respectively. In the preferred embodiment, chlorine is fed into the reactor via tube 19 and hydrogen is fed into the reactor chamber via tube 21 at controlled rates.

In one embodiment of the invention, solar rays are reflector concentrates the solar rays onto a focal point reflector 27 which reflects the intense solar beam via reflector 29 through a solar sight glass 31. The intensified solar rays are directed downwardly through the solar sight glass 31 which is encased within the walls of the housing 11 and onto the surface of a conical reflector valve 33, which disperses the intense solar rays onto the surface of the reactor walls. It should be understood that the reflector 33 can have a flat or convex shape, if desired. Of primary importance, however, is the fact that the solar rays must be dispersed throughout the reaction chamber 13 in order to provide for the most efficient operation of the method and apparatus of the present invention.

As mentioned above, molecular chlorine and hydrogen gas is emitted into the chamber 13 via tubes 19 and 21, respectively. When the chlorine becomes exposed to the solar radiation within the chamber, the chlorine expands to form ionic atomic chlorine within the chamber. The chlorine and hydrogen are at least partially combined in chamber 13 to form HCl and a large amount of heat energy. Accordingly, the pressure level within the chamber 13 is substantially increased. The hydrogen, chlorine and HCl are forced through valve port 35 defined by the conical reflector 13 and the wall 17. The gas is passed into the combustion chamber 15. Also, coupled to the combustion chamber 15 is atmospheric oxygen via a plurality of openings 37. The hydrogen and chlorine combine in the presence of the atmospheric oxygen, with controlled explosive violence, to thereby create hydrogen chloride gas and intense heat and pressure within the chamber 15. The explosive pressures and heat thus generated are utilized to perform work by generating steam, driving a turbine and/or driving a piston, as will become more fully apparent hereinbelow. The high pressure gases generated within the chamber 15 are conducted from the chamber 15 by means of ports 39, or may be conducted from the chamber in a particular manner, as set out more fully in connection with discussion of FIGS. 4 and 5.

As will become apparent from FIG. 1, the conical reflector 33 is fixedly secured to a reciprocating support member 41 and is spring-biased to close the port 35. However, when the pressure within chamber 13 increases, at a predetermined level, the port 35 is opened by forcing the conical reflector 33 downwardly. Subsequently, upon the occurrence of a controlled explosion in the combustion chamber 15, the conical reflector is driven upwardly to close the port 35. This pulsating expansion and combustion process occurs repeatedly as the chlorine and hydrogen molecules are split into atomic hydrogen and chlorine and, subsequently, are combined to form HCl in the combustion chamber 15.

As an alternative, the conical reflector 33 can be fixedly positioned to provide a continuously open port 35 or it can be controlled by a cam to open the port 35 at preselected time intervals.

Figure 2:
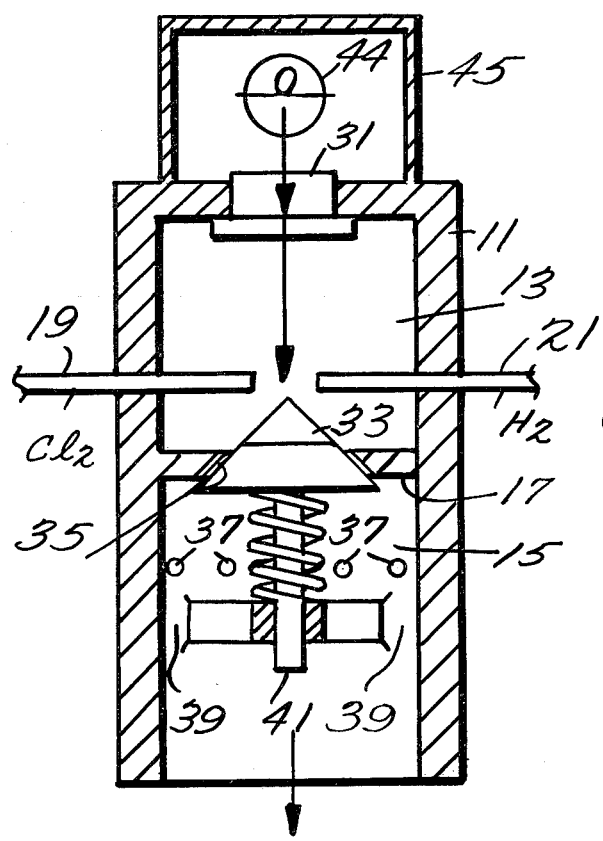
FIG. 2 is a section view taken in elevation of another embodiment of the solar reactor combustion chamber.

Refer now to FIG. 2 where there is disclosed an alternative embodiment of the solar reactor combustion chamber of the present invention. In this embodiment, the housing 11 is formed of a metallic material such as in a standard internal combustion engine wherein the engine is designed for propelling a vehicle or for other similar applications. In order to minimize corrosion, the internal walls of the housing may be formed of an impervious carbonaceous material such as "KT" Silicon Carbide which has excellent thermal shock characteristics. In this embodiment, rather than utilizing solar energy for splitting the molecular chlorine into atomic chlorine, as in the embodiment of FIG. 1, light is generated by, for example, a photographic projection lamp 44, or other suitable high-intensity light source. The light source is housed in a chamber 45, preferably having reflector walls therein so that substantially all the light generated by the source 44 is eventually directed downwardly through the solar sight glass 31 into the reaction chamber 13. The structure of the solar reactor combustion chamber is otherwise similar to that of FIG. 1 and is for the purpose of providing a means for efficiently and economically generating energy.

Figure 3:
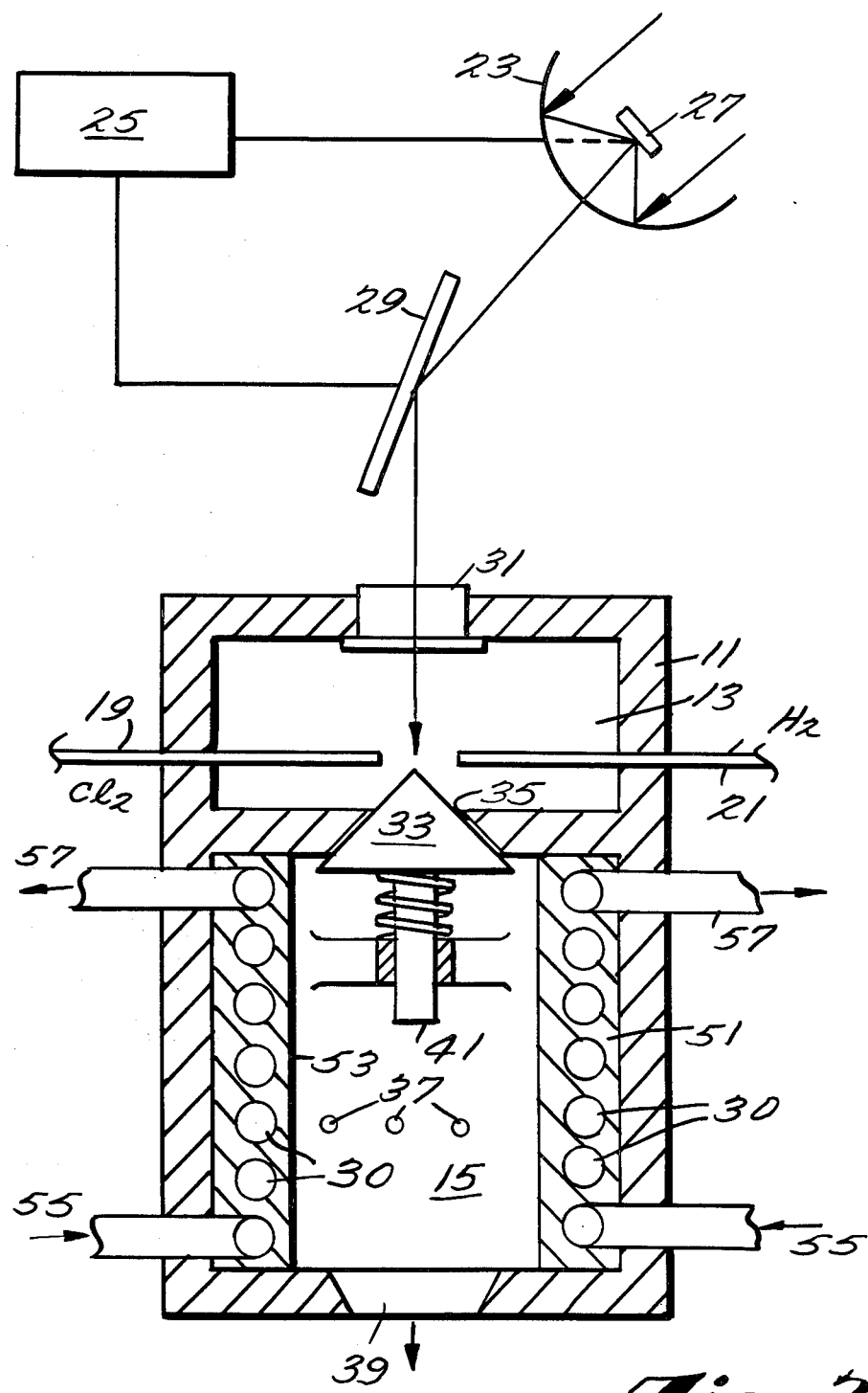
FIG. 3 is a section view taken in elevation of the solar reactor combustion chamber utilized as a steam generator.

Refer now to FIG. 3 where there is disclosed an embodiment of the solar reactor combustion chamber utilized for the purpose of generating steam. The solar reactor combustion chamber is similar to that illustrated in FIG. 1. However, carbonaceous blocks 51 are positioned along at least two internal walls of the combustion chamber 15. The carbonaceous blocks, preferably consisting of "KT" Silicon Carbide, manufactured by the Carborundum Corporation, have relatively large side surface areas 53 and a relatively small or narrow depth dimension, with each of the blocks being fixedly positioned against the side walls of the housing 11 of the combustion chamber 15. A carbonaceous block may be formed of any suitable low permeability impervious graphite or carbon material but, as aforementioned, in a preferred embodiment is formed of "KT" Silicon Carbide. Such a block can operate at working temperatures of up to 3,000° F. in an oxidizing atmosphere and has a thermal conductivity in excess of 700 BTU 1 hr./sq.ft./° F./in. In addition, "KT" Silicon Carbide is impermeable, has excellent thermal shock characteristics, and can contain liquid or gas at pressures in excess of 2000 psig.

As illustrated, channel 30 is formed in each of the blocks 51, with the channel 30 having a grid structure so that the fluid or gas passing through the channel is exposed to a maximum of the heat energy absorbed by the carbanaceous block.

In operation, a liquid or vapor such as water or steam is fed into the channel 30 at the input 55 thereto. The fluid passes upwardly through the blocks 51 and out of the ports 57. In the meantime, heat from the combustion chamber 15 is transferred to the carbanaceous blocks 51 by conduction, convection and radiation. The energy is efficiently absorbed by the carbanaceous block and is converted into heat energy. This heat energy is, in turn, transferred to the fluid passing through the channels 30. As the fluid heats up, it begins to expand, rise in temperature, and increase in velocity. As the fluid travels upward in the channels 30, the fluid absorbs more of the latent heat absorbed by the carbonaceous block and continues its expansion until it reaches a desired heat and pressure level and is exhausted through the outlet ports 57. The resulting high temperature fluid can be utilized to drive turbines or power other suitable mechanisms. In the meantime, the exhaust gases from the combustion chamber 13 are exhausted via outlet port 39.

Figure 4:
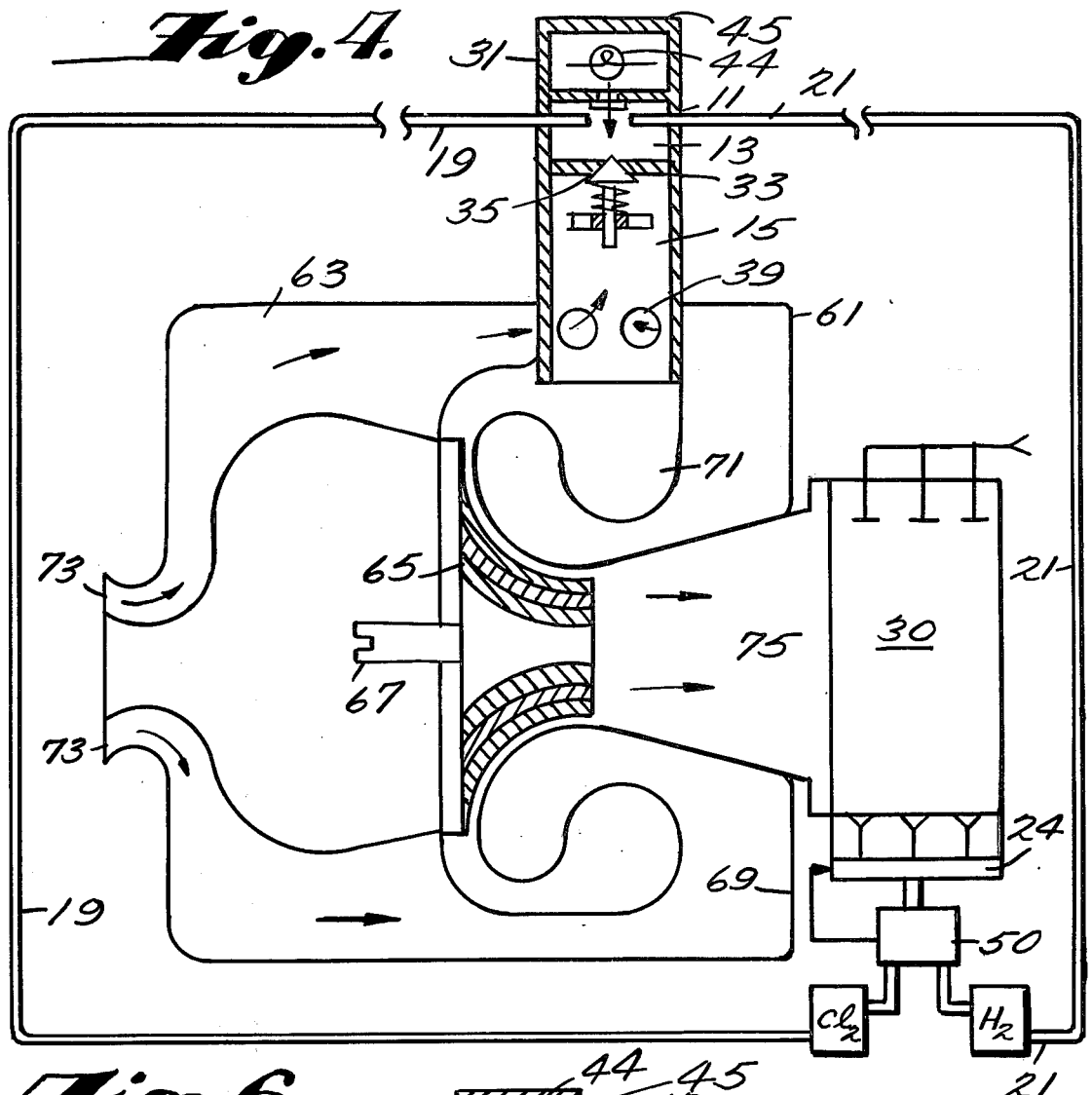
FIG. 4 is a section view taken in elevation of a solar reactor combustion chamber utilized as a turbine drive means.

Refer now to FIG. 4 where there is disclosed an alternate embodiment of the solar reactor combustion chamber of the present invention utilized to drive a turbine. In this embodiment, at least one reactor-combustion housing 11 is fixedly secured to a turbine 61 which includes a plenum chamber 63, a turbine rotor 65, mounted on a shaft 67, and a turbine housing 69 which defines therein a torus ring assembly 71, which guides the hot exhaust gases from the combustion chamber 15 into the turbine blades 65 of turbine 61. Thus, in operation atmospheric oxygen enters plenum chamber 65 via an annular port 73. The oxygen passes into the combustion chamber 15 of the reactor combustion system 11 to thereby control the formation of hydrogen chloride therein. The hot expanding exhaust products are forced outwardly through the bottom of chamber 15 into the torus ring 71 defined by the turbine housing 69. The hot gases are then forced radially inwardly toward the turbine rotor 65 to cause the turbine rotor to rapidly rotate in response thereto. The exhuast gases are then forced from the turbine out through port 75 into a scrubber chamber 30. The scrubber chamber receives water into which the HCl dissolves to form hydrochloric acid which falls to the bottom of the scrubber chamber and into container 24. The remaining gases are exhausted to the atmosphere. Sodium hydroxide is coupled to the container 24 via line 38 to thereby convert the sodium hydroxide to water and sodium chloride. The water and sodium chloride are fed to the chlorine-sodium hydroxide electrolysis cell 50. The output of the electrolysis cell in the form of chlorine and hydrogen is supplied to chamber 13 via lines 19 and 21, respectively. Thus, the sodium and chlorine are continuously recycled to thereby substantially reduce the cost of fuel over that required in conventional fossil fuel powered turbine generators. Furthermore, the emission products exhausted to atmosphere are primarily water and the elements found in the atmosphere. Accordingly, a clean burning, efficient turbine engine is provided which is relatively inexpensive to operate. While in the embodiment illustrated in FIG. 4, only one reaction combustion chamber is illustrated, it should be understood that a plurality of such reaction combustion chambers can be positioned about the outside periphery of the turbine housing 69 to provide a more uniform distribution of the high velocity exhaust gases generated in the reaction chamber 15.

Figure 5:
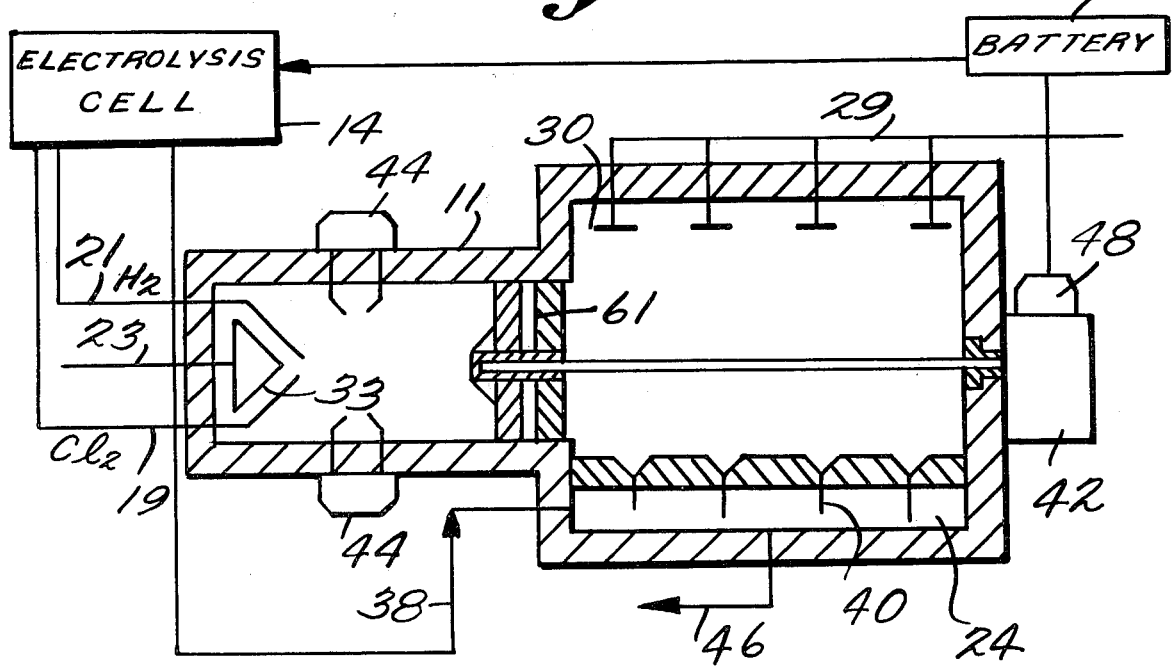
FIG. 5 is a schematic illustration of an alternate embodiment of the solar reactor combustion chamber utilized as a turbine drive means.

Refer now to FIG. 5 where there is disclosed in schematic form an alternative embodiment of the solar reactor engine of the present invention. In this embodiment the housing 11 is formed of a metallic material such as in a standard gas turbine engine wherein the engine is designed for propulsion or other mobile applications. In order to reduce corrosion the inner walls of the reactor may be lined with an impervious carbonaceous material. The reactants, hydrogen and chlorine, are supplied to the reactor housing 11 by means of lines 21 and 19, respectively. The hydrogen and chlorine can be provided by means of storage containers (not shown) or can be generated on a continuous basis. Oxygen, preferably in atmospheric form, is supplied to chamber 15 by means of line 38 for the purpose of controlling the reaction of the hydrogen with the chlorine. In this embodiment rather than utilizing solar energy for sustaining reaction in the reaction chamber 13, the light is generated by a high intensity light source 44. As before, the light generated by the high intensity light source 44 is directed into the chamber 13 and against the conical reflector 33. The light is thus dispersed against the walls of the reaction chamber 13 to thereby generate atomic chlorine. The chlorine and hydrogen are combined in chamber 15 to form hydrogen chloride. The hydrogen chloride thus formed is at a high temperature and pressure level and is thereby forced through the turbine blades of turbine 61 into the exhaust chamber 30. The turbine blades of turbine 61 are thereby rapidly driven with the mechanical energy thus generated coupled to a power take-off 42 which may drive a mechanical means for moving a vehicle and in addition a portion of the mechanical power may be utilized to drive a generator 48. The output of the generator 48 is utilized to recharge battery 50 which in turn provides DC current for energizing electrolysis cell 14. In the exhaust chamber 30, water is dispersed through tubes 28 to combine with the hydrogen chloride to form hydrochloric acid. This acid is conveyed away from the exhaust chamber 30 into a container 24. By combining the HCl with water a partial vacuum is created in the exhaust chamber 30 which assists in driving the turbine because of the increased pressure differential thereacross.

In the preferred embodiment sodium hydroxide from a chlorine-sodium hydroxide electrolysis cell 14 is supplied to the container 24 via line 38. The hydrochloric acid is mixed with the sodium hydroxide to produce water and sodium chloride. The water and sodium chloride are fed from the container 24 to the chlorine-sodium hydroxide cell via line 46. The water and sodium chloride are converted into fuel and/or reactants, hydrogen and chlorine and sodium hydroxide. This process is continuously repeated. The output from the alternator 48 is utilized to sustain electrolysis in the chlorine-sodium hydroxide electrolysis cell.

Figure 6:
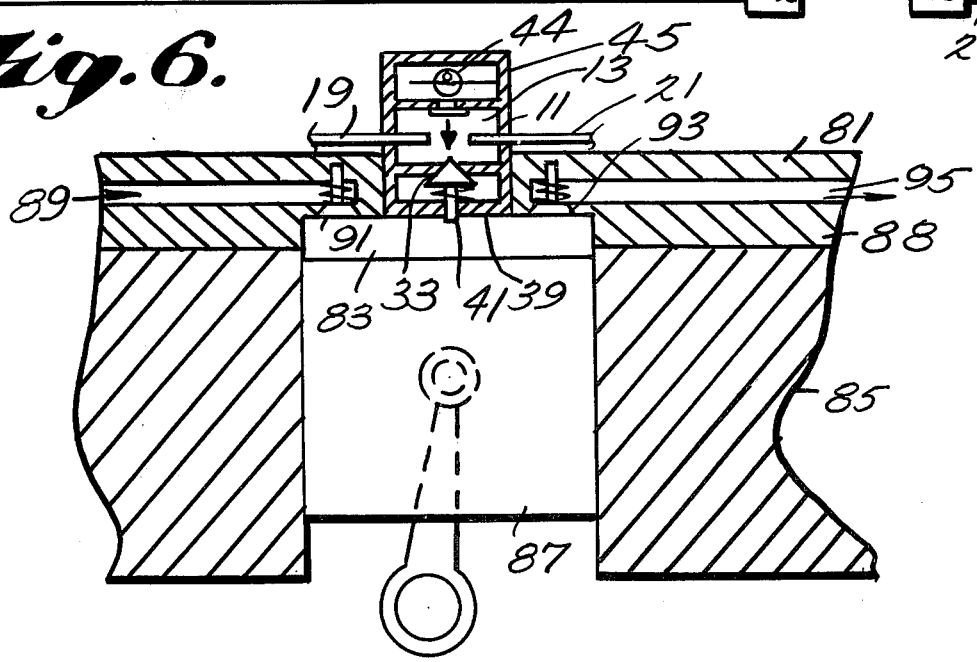
FIG. 6 is a section view taken in elevation of a solar reactor combustion chamber utilized as a piston engine drive means.

Refer now to FIG. 6 where there is disclosed an alternate embodiment of the solar reactor combustion chamber of the present invention utilized to drive a piston in a piston engine. In this embodiment, the housing 11 of the reactor combustion chamber is fixedly secured to the engine housing 81 with the exhaust port 39 from the combustion chamber 15 leading into a chamber 83 defined by the engine block 85, piston 87 and header block 88. Atmospheric oxygen is conducted into the chamber 83 via manifold 89 and intake valve 91. This oxygen mixes with the atomic chlorine and hydrogen, passing downwardly into the chamber 15 and into the chamber 83 to create a substantial expansion thereof via a controlled explosive reaction. The resulting combustion products are exhausted from the chamber 83 via exhaust valve 93 and exhaust manifold 95. Each time oxygen is permitted into the chamber 83, an explosion occurs which drives the piston 87 downwardly. Upon the return upward stroke, a conical reflector valve 33 is driven upwardly to close the port 35. At the same time, exhaust valve 93 is lowered, causing the exhaust products to pass out to exhaust manifold 95. Subsequently, the piston 87 is again moved downwardly, permitting the conical reflector valve 33 to open up to permit atomic chlorine and hydrogen to pass downwardly into the combustion chamber 15 and the chamber 83. At the same time, oxygen is coupled to the chamber 83 via intake valve 91 to control the exothermic combination of the hydrogen and chlorine. The piston is then driven downwardly to complete the cycle.

Refer now to FIG. 7 which is a simplified schematic illustration of a single cycle internal combustion engine. In this embodiment a piston 80 defines a combustion chamber 13 into which a measured amount of chlorine and hydrogen and atmospheric oxygen is supplied via lines 19, 21 and 37, respectively. The resulting controlled explosion drives the piston 80 downwardly until the top surface 82 of the piston passes the exhaust port 84 of the cylinder defined by the housing 11. The reaction gas, hydrogen chloride, as well as air egress through the port into a scrubber chamber (not shown) of similar degree to that illustrated in FIG. 6. The piston is then returned to a top dead-center position. Before the piston reaches the top dead-center position, the chlorine and hydrogen are supplied to the chamber 13. When the piston reaches top dead-center, the light source 44 is energized synchronously with movement of the piston 80 to cause the hydrogen and chlorine to combine exothermically to thereby force the piston 80 downwardly.

It should be understood the solar reactor of the present invention can be used to drive a rotary engine such as a Wankel engine as well as two and four cycle piston engines. The embodiments of FIGS. 6 and 7 merely illustrate the application of the solar reactor engine to piston engines for efficiently and economically driving these engines.

While the present invention has been disclosed in connection with a preferred embodiment thereof, it should be understood that there may be other variations of the invention which fall within the spirit and scope thereof, as defined by the appended claims.

What is claimed is:
1. A reactor comprising
a reactor chamber;
means for controllably coupling chlorine and hydrogen to said reactor chamber;
means for directing electro-magnetic radiation into said chamber to thereby ionize said chlorine and hydrogen;
a combustion chamber;
valve means communicating said reaction chamber with said combustion chamber; and
means for controllably coupling oxygen into said combustion chamber, said ionized hydrogen and chlorine passing through said valve into said combustion chamber to exothermically react therein to form hydrogen chloride at a high pressure and temperature level.

2. The reactor combustion chamber of claim 1 wherein said electro-magnetic radiation is solar radiation.

3. The reactor of claim 2 further comprising
means for concentrating said electro-magnetic radiation;
means for directing said concentrated radiation into said reaction chamber; and
means for dispersing said radiation in said reaction chamber so that said radiation is dispersed throughout said chamber.

4. The reactor of claim 1 wherein said electro-magnetic radiation is generated by an artificial means.

5. A reactor combustion engine comprising
a reactor chamber;
means for controllably coupling chlorine and hydrogen to said reactor chamber;
means for directing electro-magnetic radiation into said chamber to thereby expand said chlorine and hydrogen and to ionize said chlorine and hydrogen;
a combustion chamber;
valve means communicating said reaction chamber with said combustion chamber; and
means for controllably coupling oxygen to said combustion chamber, said chlorine and hydrogen reacting exothermically in said combustion chamber in the presence of said oxygen to generate hydrogen chloride at a high pressure and temperature level, at least one block of low permeability impervious silicon carbide having a relatively large conductive-convective radiation-receiving side surface and a relatively small depth dimension positioned in said combustion chamber, a fluid-conducting channel formed in said block in the form of a grid so that said channel passes in proximity to a substantial portion of said radiation-receiving sides of said block, said high temperature exothermic reaction in said combustion chamber heating said silicon carbide block to thereby heat said fluid passing therethrough.

6. The reactor combustion engine of claim 5 wherein said silicon carbide block comprises "KT" silicon carbide.

7. The reactor combustion engine of claim 6 wherein said electro-magnetic radiation is solar radiation.

8. The reactor combustion engine of claim 7 further comprising
means for concentrating said electro-magnetic radiation;
means for directing said concentrated radiation into said chamber; and
means for dispersing said radiation in said chamber so that some radiation is dispersed throughout the chamber.

9. A reactor combustion engine comprising
a reactor chamber;
means for controllably coupling chlorine and hydrogen to said reactor chamber;
means for directing electro-magnetic radiation into said chamber to thereby expand said hydrogen and chlorine and to ionize said hydrogen and chlorine;
a combustion chamber;
valve means communicating said reaction chamber with said combustion chamber;
means for coupling oxygen to said combustion chamber to thereby exothermically react said hydrogen and said chlorine to generate hydrogen chloride at a high pressure and temperature level;

a turbine; and means for communicating said combustion chamber with said turbine to permit said generated hydrogen chloride at high pressure and temperature to drive the rotor of said turbine.

10. The reactor combustion engine of claim 9 wherein said electro-magnetic radiation is generated by artificial means.

11. A solar reactor combustion engine comprising a solar reactor chamber;

means for controllably coupling chlorine and hydrogen to said solar reactor chamber;

means for directing electro-magnetic radiation into said chamber to thereby expand said hydrogen and chlorine and to ionize said hydrogen and said chlorine;

a combustion chamber;

valve means for communicating said reaction chamber with said combustion chamber;

an engine housing, said reactor chamber and said combustion chamber being positioned with respect to said engine housing, said engine housing forming a cylinder therein;

a piston for reciprocally moving within said cylinder;

means for controllably coupling oxygen to said combustion chamber to thereby exothermically react said hydrogen and chlorine to generate hydrogen chloride at a high pressure and temperature level, said high pressure hydrogen chloride forcing said piston downwardly in said cylinder; and means for exhausting said hydrogen chloride and said oxygen.

12. The solar reactor combustion engine of claim 11 further comprising means for concentrating said solar radiation;

means for directing said concentrated radiation into said reaction chamber; and means for dispersing said radiation in said reaction chamber so that said radiation is dispersed throughout the chamber.

* * * * *